United States Patent [19]

Watanabe

[11] 4,388,664
[45] Jun. 14, 1983

[54] APPARATUS FOR PROTECTING VACUUM INTERRUPTER TYPE ON-LINE TAP CHANGER

[75] Inventor: Tetsuo Watanabe, Kawasaki, Japan

[73] Assignee: Fuji Electric Co., Ltd., Kanagawa, Japan

[21] Appl. No.: 289,650

[22] Filed: Aug. 3, 1981

[30] Foreign Application Priority Data

Aug. 4, 1980 [JP] Japan ................................. 55-106389
Aug. 4, 1980 [JP] Japan ................................. 55-106390

[51] Int. Cl.$^3$ ............................................. H02P 13/06
[52] U.S. Cl. ...................................... 361/93; 323/341; 361/5
[58] Field of Search ............... 323/340, 345, 341, 255, 323/256, 257, 258; 361/3, 5, 9, 10, 11, 93, 102

[56] References Cited

U.S. PATENT DOCUMENTS

| | | | |
|---|---|---|---|
| 3,581,188 | 5/1971 | Watanabe et al. | 323/341 X |
| 3,602,807 | 8/1971 | Prescott | 323/341 |
| 3,720,867 | 3/1973 | Rathbun | 323/341 |

Primary Examiner—Harry E. Moose, Jr.
Attorney, Agent, or Firm—Sughrue, Mion, Zinn, Macpeak & Seas

[57] ABSTRACT

An apparatus for protecting a vacuum interrupter type on-line tap changer in which a cross current flows between taps through a current limiting resistor for a predetermined time by shorting selected taps therebetween at the time of tap changing operations. Vacuum interrupters are employed as current switching elements. A dial switch selects the position of the tap of the tap changer. A limit switch closes only at a predetermined position of the dial switch during tap changing operations. Thus, a cross current between the taps or a load current flowing for a long time due to a drop in the degree of vacuum of the vacuum interrupters is detected, thereby preventing burn-out of the current limiting resistor and damage to contacts of a disconnecting switch due to interruption of the current.

8 Claims, 15 Drawing Figures

APPARATUS FOR PROTECTING VACUUM INTERRUPTER TYPE ON-LINE TAP CHANGER

BACKGROUND OF THE INVENTION

The present invention relates to an on-line tap changer which employs a vacuum valve. More particularly, the invention relates to an apparatus for protecting a vacuum interrupter type on-line tap changer which uses a vacuum interrupter having an exellent breaking or interrupting performance with long contact lifetime as a current switching device in a change-over switch.

There have heretofore been put to practical use two types of on-line tap changers using a vacuum interrupter, one of which employs a reactor and the other of which employs a resistor as a current limiting impedance. The more recent vacuum interrupter type on-line tap changer of this type is considered to be advantageous in view of breaking performance and production in that it employs a resistor as a current limiting impedance.

Due to recent advances in vacuum interrupter production technology, the reliability of maintaining the degree of vacuum in the vacuum interrupter has been much enhanced compared with the conventional vacuum interrupter. In the case where a vacuum interrupter is, however, used as a current switching element for an on-line tap changer, the interrupter must have a practical lifetime of 1,000,000 switching operations. This imposes very severe mechanical constraints. In addition, if the vacuum is accidentally broken in the vacuum interrupter, a short-circuit occurs between the opened electrodes of the vaccum interrupter, which accordingly causes a short-circuit between winding taps. This further introduces a dangerous state in the transformer with which the interrupter is used. Therefore, it is necessary to proect against an accidental drop in the degree of vacuum in the vacuum interrupter.

For this purpose, a protecting system as indicated in FIGS. 1A through 1F, for example, has been employed with a conventional vacuum interrupter type on-line tap changer which uses a resistor and three vacuum interrupters, hereinafter referred as to "a 1-resistor 3-vacuum interrupter type". More specifically, FIGS. 1A through 1F show a circuit of the conventional vacuum interrupter type on-line tap changer corresponding to one phase segment in which the operation is being switched from a tap no. 1 to a tap no. 2.

Figure 1A:
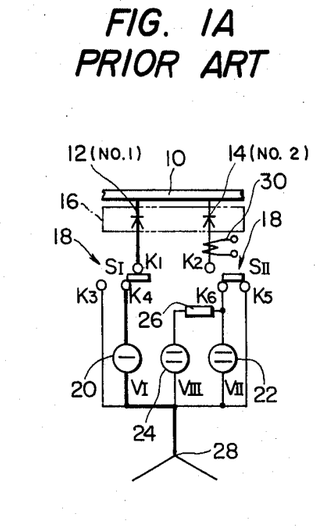
FIGS. 1A through 1F are circuit diagrams showing the steps of changing the taps of a conventional vacuum interrupter type on-line tap changer for one phase employing a 1-resistor 3-vacuum valve type.

In FIG. 1A, reference numeral 10 indicates a tap winding, 12 and 14 taps no. 1 and no. 2 which are connected to a tap winding 10, 16 a tap selector, 18 a disconnecting switch, 20, 22 and 24 vacuum interrupters $V_I$, $V_{II}$ and $V_{III}$, 26 a current limiting resistor, and 28 a secondary side neutral point of a transformer. Reference character $K_1$ through $K_6$ indicate contacts which make contact with the respective contact members $S_I$ and $S_{II}$ of the disconnecting switch provided corresponding to taps no. 1 and no. 2.

In such a vacuum interrupter type on-line tap changer thus constructed, there is employed as means for protecting the transformer against a short-circuit between the taps caused by a drop in the degree of vacuum of the vacuum interrupters $V_I$ and $V_{II}$ a current transformer 30 connected to the circuit at tap no. 2. The transformer 30 serves to detect a short-circuit current between the taps, thereby breaking the transformer from the circuit in a protecting system.

Since in such a protecting system a detecting relay (an overcurrent relay) connected to the current transformer detects only a shorting current between the taps even when the degree of vacuum of the vacuum interrupter $V_{III}$ drops so that the vacuum interrupter $V_{III}$ reaches the state where current will flow between the opened contacts thereof, a cross current limited by the resistor 26 (a circulating current between the taps) will flow between the taps for a predetermined time. This occurs during the normal tap changing step even if the detecting current of the detecting relay is set at a small value. Accordingly, it is impossible to distinguish whether the shorting current between the taps is normal or abnormal. Therefore, it is very difficult in the conventional vacuum interrupter type on-line tap changer protecting system to detect an abnormal state due to a short-circuit between taps.

Figure 1B:
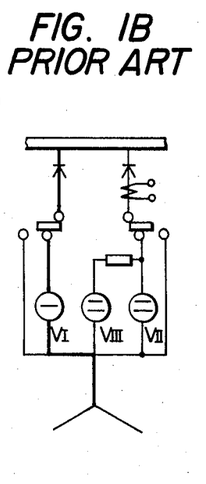

The action of the vacuum interrupter type on-line tap changer shown in FIG. 1 when the degree of vacuum of the vacuum interrupter $V_{II}$ (22) drops to the extent that a current flows between the opened contacts will be described with reference to the switching sequence diagrams of the disconnecting switch 18 and the vacuum interrupters $V_I$ through $V_{III}$ shown in FIGS. 2 and 3. FIG. 2 shows the switching sequence where the tap is changed from tap no. 1 to tap no. 2 while FIG. 3 shows the switching sequence where the tap is changed from tap no. 2 to tap no. 3 (or tap no. 1).

Figure 1C:
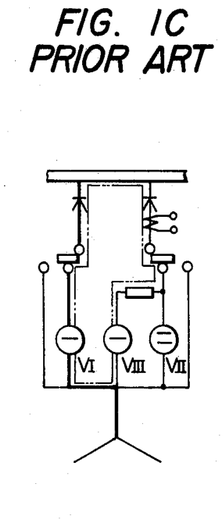
Figure 1D:
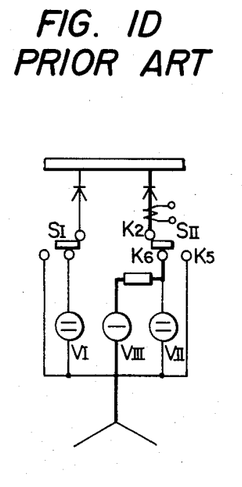
Figure 1E:
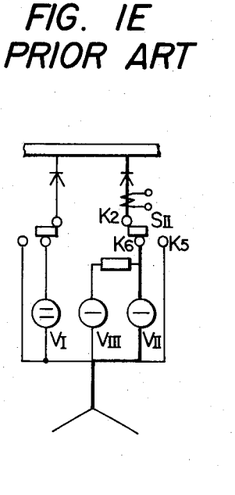
Figure 1F:
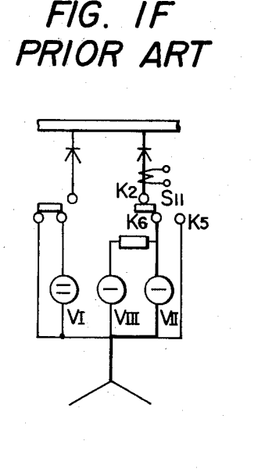
Figure 2:
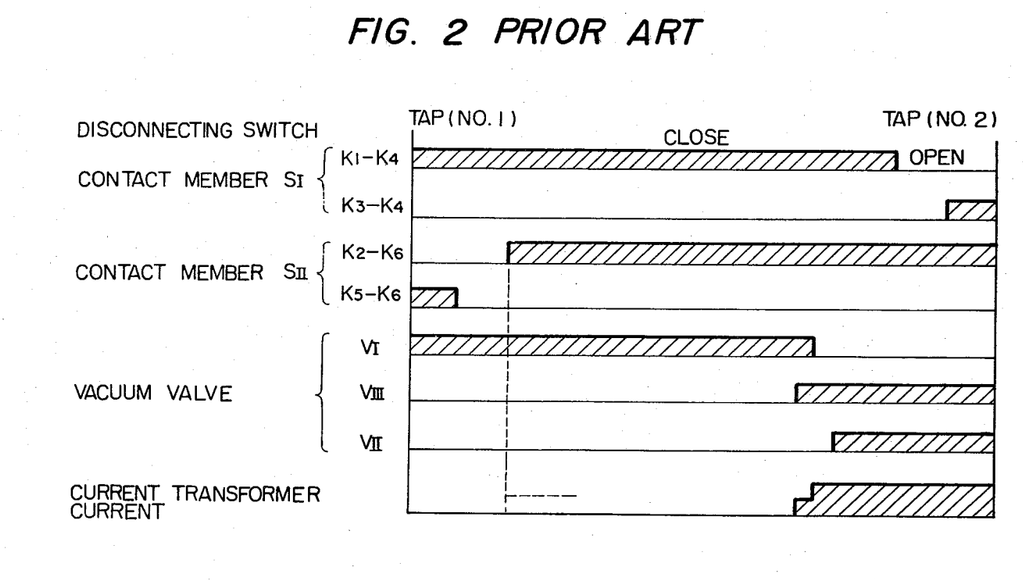
FIG. 2 is a diagram showing the switching sequence of opening and closing operations of the respective components in the circuit shown in FIGS. 1A through 1F between a tap no. 1 and a tap no. 2.
Figure 3:
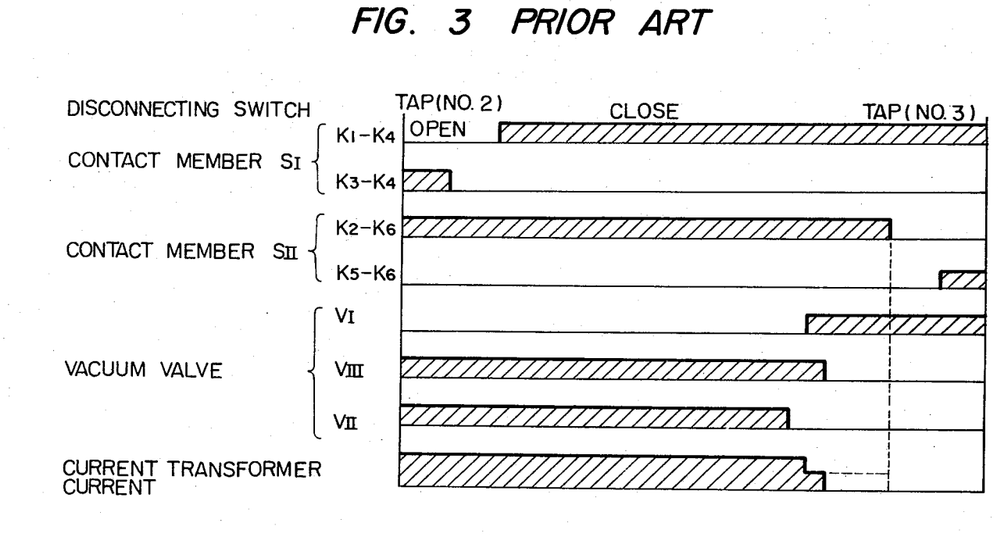
FIG. 3 is a diagram showing the switching sequence of opening and closing operations of the respective components in the circuit shown in FIGS. 1A through 1F between tap no. 2 and a tap no. 3 (or tap no. 1)

If the vacuum interrupter $V_{II}$ malfunctions in the case where the tap is changed from the tap no. 1 to tap no. 2, a cross current between the taps will flow simultaneously upon closure of the contacts $K_2$ and $K_6$ due to a contact $S_{II}$ of the disconnecting switch 18 (as indicated by a broken line in FIG. 1C and by a current transformer current characteristic in FIG. 2). Accordingly, since the current limiting resistor 26 can operate at its rated heat capacity only for short time, the resistor 26 will overheat resulting in burn-out. Even if the vacuum interrupters $V_I$, $V_{II}$ and $V_{III}$ are switched to a state where the resistor 26 will not be burnt out, the tap cannot be normally changed, eventually resulting in the possibility of a short-circuit between taps.

In FIGS. 1A through 1F, the circuits indicated by thick solid lines show load current paths. If the vacuum interrupter $V_{III}$ malfunctions in the case where the tap is changed from tap no. 2 to tap no. 3 (or tap no. 1), the vacuum interrupter $V_{III}$ cannot break a cross current between the taps. In this case, the current limiting resistor 26 will sustain a current for a long time, as indicated by a broken line in the current transformer current characteristic in FIG. 3, that is, until the circuit across the taps is opened between the contacts $K_2$ and $K_6$ by a contact member $S_{II}$ of the disconnecting switch 18. This also causes burn-out of the resistor 26 similar to the above case. If the resistor 26 is not burnt out, the cross current between the taps will be interrupted by the opening of the contacts $K_2$ and $K_6$ by the disconnecting switch 18. Since the contact of the switch 18 is not, however, normally provided with an arc resistance property, serious damage will occur due to the interruption of the cross current between the taps.

Further, the above described 1-resistor 3-vacuum interrupter type on-line tap changer is constructed to normally switch the vacuum interrupters instantaneously by a quick-break mechanism using a spring. In the case where a difficulty arises which causes an increase in the driving resistance at the driven side, of for example, a cam disc, levers, bearings or like of the quick-break mechanism, the energy of the spring is cancelled and consumed, and as a result, the contacts may not normally complete switching operations as are required. More specifically, the switching operation of the vacuum interrupter $V_{III}$ will stop in the position intermediate from the state shown in FIG. 1C and will be in the state shown in FIG. 1D. Since, even in this case, a cross current flows between the taps or a load current flows through the current limiting resistor for a long time in the same manner as the above case, a serious difficulty such as burn-out of the resistor may occur.

In the conventional vacuum interrupter type on-line tap changer there is thus no protection against incompleted switching of the three vacuum interrupters $V_I$ through $V_{III}$ and against a decrease or loss of vacuum in the vacuum interrupters $V_{III}$.

SUMMARY OF THE INVENTION

Accordingly, an object of the present invention is to provide an apparatus for protecting a vacuum interrupter type on-line tap changer which can readily detect a short-circuit between taps caused by a drop in the degree of vacuum in a vacuum interrupter and in response thereto quickly break the connection of a transformer in the circuit, thereby eliminating the aforementioned disadvantages and drawbacks of the conventional vacuum interrupter type on-line tap changer protecting system.

Another object of the invention is to provide an improved apparatus for protecting a vacuum interrupter type on-line tap changer which can detect a cross current between taps or a load current flowing for a long time due to a drop in the degree of vacuum and can detect an imcomplete switching state in a vacuum interrupter connected to a current limiting resistor thereby preventing burn-out of the current limiting resistor and/or damage to contacts of a disconnecting switch.

A further object of the invention is to provide an apparatus for protecting a vacuum interrupter type on-line tap changer which can detect an abnormal current in a current transformer using an overcurrent relay when a short-circuit occurs between taps due to a drop in the degree of vacuum in vacuum interrupters and/or an interruption failure occurs and thereby immediately breaking the connection of the transformer from the circuit so as to protect it.

A still further object of the invention is to provide an apparatus for protecting a vacuum valve type on-line tap changer in which the contacts of a dial switch are protected from damage due to arcing even over long periods of time by eliminating current switching operations so as to improve the durability of the entire apparatus.

These, as well as other objects of the invention, are met by an apparatus for protecting a vacuum interrupter type on-line tap changer including a vacuum interrupter used as a current switching element for shorting between taps at the time of changing taps thereby passing a cross current between the taps through a current limiting resistor for a predetermined time, a current transformer connected to a circuit connected with the current limiting resistor at the time of shorting between the taps, a series circuit of an overcurrent relay and a current detecting relay connected to the current transformer and also connected to a control power source, and a relay control circuit connected with a contact cooperating with the current detecting relay closing only at a predetermined time during the tap changing operation.

In the apparatus for protecting a vacuum interrupter type on-line tap changer of the invention, the relay control circuit includes a dial switch for selecting the position of the tap of the tap changer, a limit switch which closes only at a predetermined position during tap changing operation, a contact cooperating with the current detecting relay and the detecting relay in a series connection. In this case, the dial switch is connected to a control current only at one of odd numbered taps and even numbered taps, thereby switching the contacts substantially at intermediate positions at tap changing times.

Further, the limit switch includes two projections controlled by a cam which rotates at a rate of one revolution per one tap changing operation and which closes at two positions immediately after the contacts of the disconnecting switch connected to the current limiting resistor are connected to the tap and immediately before the connection of the taps is opened.

In the apparatus of the invention, contacts cooperating with the detecting relay provided in the relay control circuit are joined to the breaking conditions of the breaker thereby interrupting the transformer from the circuit in accordance with the operation of the detecting relay.

Yet further, these as well as other objects of the invention are met by an apparatus for protecting a vacuum interrupter type on-line tap changer including a vacuum interrupter used as a current switching element for shorting between taps at the time of changing taps thereby passing a cross current between taps through a current limiting resistor for a predetermined time, a current transformer connected to a circuit connected with the current limiting resistor at the time of shorting between the taps, a parallel circuit of an overcurrent relay and a current detecting relay connected in series with the current transformer and also to a control power source, and a relay control circuit which closes only at a predetermined time during a tap changing operation in which contacts cooperating with the relay control circuit are connected in series with the current detecting relay.

In the apparatus for protecting a vacuum valve type on-line tap changer of the invention, the relay control circuit includes a dial switch for selecting the position of the tap of the tap changer, a limit switch which closes only at a predetermined position during a tap changing operation, and a relay for operating the contact connected in series with a current detecting relay. In this case, the dial switch is connected to a control current only at one of odd numbered taps and even numbered taps thereby switching the contacts substantially at intermediate positions at tap changing times. Further, the limit switch includes two positions controlled by a cam which rotates at a rate of one revolution per tap changing operation and which closes at two positions immediately after the contacts of the disconnecting switch connected to the current limiting resistor are connected to the tap and immediately before the connection to the taps is opened.

In the apparatus of the invention, the contacts cooperating with the current detecting relay are operated in accordance with the breaking conditions of the breaker thereby interrupting the transformer from the circuit in accordance with the operation of the current detecting relay.

DESCRIPTION OF THE PREFERRED EMBODIMENTS

A first embodiment of an apparatus for protecting a vacuum interrupter type on-line tap changer according to the invention will be described with reference to FIG. 4.

Figure 4:
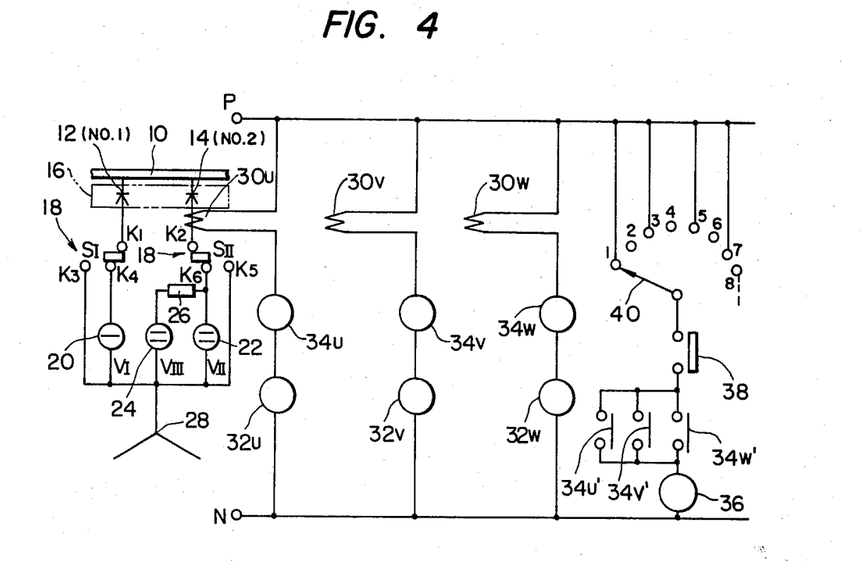
FIG. 4 is a circuit diagram showing a preferred first embodiment of an apparatus for protecting a vacuum interrupter type on-line tap changer according to the invention.

FIG. 4 shows a circuit diagram of the apparatus for protecting a vacuum interrupter type on-line tap changer for one phase employing a 1-resistor 3-vacuum interrupter type similar to that of FIG. 1 in which like reference numerals and characters designate the same or equivalent components in FIG. 1. A description of the like components will be omitted for convenience of description.

The taps 12 (no. 1) and 14 (no. 2) are connected to the tap winding 10 through the tap selector 16 and via lead wires to the contacts $K_1$ and $K_2$, respectively, of the disconnectint switch 18 in the same manner as in the conventional vacuum interrupter type on-line tap changer protecting system described above. Three current transformers $30_U$, $30_V$ and $30_W$ are respectively connected to the lead wires from the tap selectors 16 to the disconnecting switch 18 in the respective three phases as indicated in FIG. 4. In FIG. 4, only the connection to phase U is shown for convenience although the other phases V and W are connected in the same manner as the phase U with respect to the current transformers $30_V$ and $30_W$.

The contacts $K_1$ and $K_2$ are connected and disconnected through the movable contact members $S_I$ and $S_{II}$, respectively, to and from the contacts $K_3$, $K_4$ and $K_5$, $K_6$, respectively, in the disconnecting switch 18. The contact $K_4$ among these contacts $K_3$ through $K_6$ is connected through the vacuum interrupter circuit breaker $V_I$ to the secondary side neutral point 28 of the transformer. The contact $K_6$ is connected through the vacuum interrupter circuit breaker $V_{II}$ to the secondary side neutral point 28 of the transformer and is also connected through the current limiting resistor 26 to the secondary side neutral point 28 of the transformer. The contacts $K_3$ and $K_5$ are connected directly to the secondary side neutral point 28 of the transformer as shown in the same manner as in the conventional vacuum interrupter type on-line tap changer protecting system described above.

To the current transformers $30_U$, $30_V$ and $30_W$ are connected in series overcurrent relays $32_U$, $32_V$ and $32_W$, respectively, and current detecting relays $34_U$, $34_V$ and $34_W$, respectively. Further, the series circuits of the current transformers $30_U$, $30_V$ and $30_W$, the overcurrent relays $32_U$, $32_V$ and $32_W$, and the current detecting relays $34_U$, $34_V$ and $34_W$ are connected in parallel with each other between the terminals P and N of a control power source.

The overcurrent relays $32_U$, $32_V$ and $32_W$ serve to detect abnormal current flowing in the circuit when a short-circuit occurs between the taps due to a drop in the degree of vacuum of the vacuum interrupter circuit breaker $V_I$ (20) or $V_{III}$ (24), thereby breaking or interrupting the transformer from the circuit. This operation will be described in greater detail below.

The current detecting relays $34_U$, $34_V$ and $34_W$ cooperate with a relay control circuit, which will be described in greater detail, to prevent operations, since they can detect even very small currents. Specifically, the current detecting relays detect a load current flowing at the time of normal tap changing operations and a cross current flowing between the taps.

The relay control circuit includes a circuit in which contacts $34_U'$, $34_V'$ and $34_W'$ cooperating with the current detecting relays $34_U$, $34_V$ and $34_W$, are connected in parallel with each other, a detecting relay 36 connected between one end of the circuit and the terminal N of the control power source, a limit-switch 38 connected between the other end of the circuit and a dial switch 40, and the dial switch 40 connected between the other side terminal of the dial switch 40 and the terminal P of the control power source.

The detecting relay 36 includes a breaker contact (not shown) which disconnects the transformer from the circuit when the contact opens and before the current limiting resistor 26 can burn-out due to failure of the vacuum valve $V_{III}$.

The limit switch 38, which is installed in a motor operating unit, includes a cam which undergoes one revolution per tap changing operation and which closes the contact 38 at a position immediately after the position of the cam where the contact member $S_{II}$ of the disconnecting switch 18 makes connection between the contacts $K_2$ and $K_6$ of the switch 18 (as indicated in FIG. 1B) and immediately before the position of the cam where the contact member $S_{II}$ of the switch 18 is disconnected from between the contacts $K_2$ and $K_6$.

Figure 5:
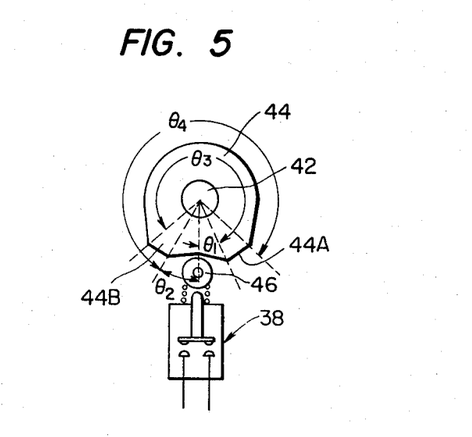
FIG. 5 is an explanatory diagram showing a structure of a preferred example of a limit switch employed in the circuit shown in FIG. 4.

More specifically, as shown in FIG. 5 which shows a preferred example of the limit switch 38, the limit switch 38 includes a rotating shaft 42 of the motor operating unit and a bifurcated cam 44 mounted on the shaft 42 having cam projections 44A and 44B formed so that an angular relationship of $\theta_1 = \theta_2$ is provided between the projections 44A and 44B with respect to the limit switch roller 46 of the limit switch 38 at the position where the tap is stopped at its normal position for closing the limit switch 38 and at the same tap changing positions with respect to both normal and reverse rotating directions of the shaft 42. It is necessary in this case that the angle of the cam 44 be such that the closing of the limit switch 38 coincides with the time of connection of the contact member $S_{II}$ of the switch 18 between the contacts $K_2$ and $K_6$ after the start of the tap changing operation and also with a time point immediately before the contact member $S_{II}$ of the switch 18 opens between the contacts $K_2$ and $K_6$. More particularly, in FIG. 5, when the cam 44 is rotated clockwise, the position at which the cam projection 44A initially closes the limit switch 38 is determined by the angle $\theta_1$ which is set to correspond to a position immediately after the contact member $S_{11}$ of the switch 18 closes between the contacts $K_2$ and $K_6$ of the disconnecting switch 18 (as indicated in FIG. 2). Further, the position at which the cam projection 44B closes the limit switch 38 near the end of the tap changing operation is determined by setting the angle $\theta_3$ of the cam projection 44B of the cam 44 so that the limit switch 38 is closed immediately before the contact member $S_{II}$ of the switch 18 opens from between the contacts $K_2$ and $K_6$ of the switch 18 (as indicated in FIG. 3) after the vacuum interrupter $V_{III}$ is closed.

Similarly, when the cam 44 is rotated counterclockwise, the positions at which the cam projections 44A and 44B close the limit switch 38 are determined by setting the angles $\theta_2$ and $\theta_4$, respectively, in the same manner as for rotation of the cam 44 clockwise. It is noted that the relative angles between the cam projections 44A and 44B are normally $\theta_1 = \theta_2$ and $\theta_3 = \theta_4$.

The dial switch 40 is used to select alternately the position of the taps. Only the odd-numbered taps are actually connected between the terminals P and N of the control power source, i.e., tap no. 1, tap no. 3, tap no. 5, tap no. 7. More specifically, in the first preferred embodiment of the invention the taps are connected so that the vacuum interrupter $V_{III}$ is opened when the dial switch 40 is set at odd number taps. On the other hand, if it is desired that the vacuum interrupter $V_{III}$ be opened when the dial switch is set at even number taps, the dial switch 40 is connected between the terminals P and N of the control power source at only even number taps.

The dial switch 40 is normally installed within the motor operating unit and is rotatably displaced at a predetermined angle for changing between adjacent taps by a Geneva mechanism or the like and the contact position of the tap is shown on an indicator plate. Since the dial switch 40 is generally driven by a Geneva gear, the position at which a tap is changed from one contact to another is set at approximately 180° for a change rate of 360°/tap.

The operation of the apparatus for protecting the vacuum interrupter type on-line tap changer of the first embodiment of the invention as shown in FIG. 4 will be described with reference to sequence diagrams of the disconnecting switch 18, the vacuum valves $V_I$ through $V_{III}$, the limit switch 38 and the dial switch 40 in the case where the tap of the vacuum interrupter type on-line tap changer is changed by one tap position.

Figure 6:
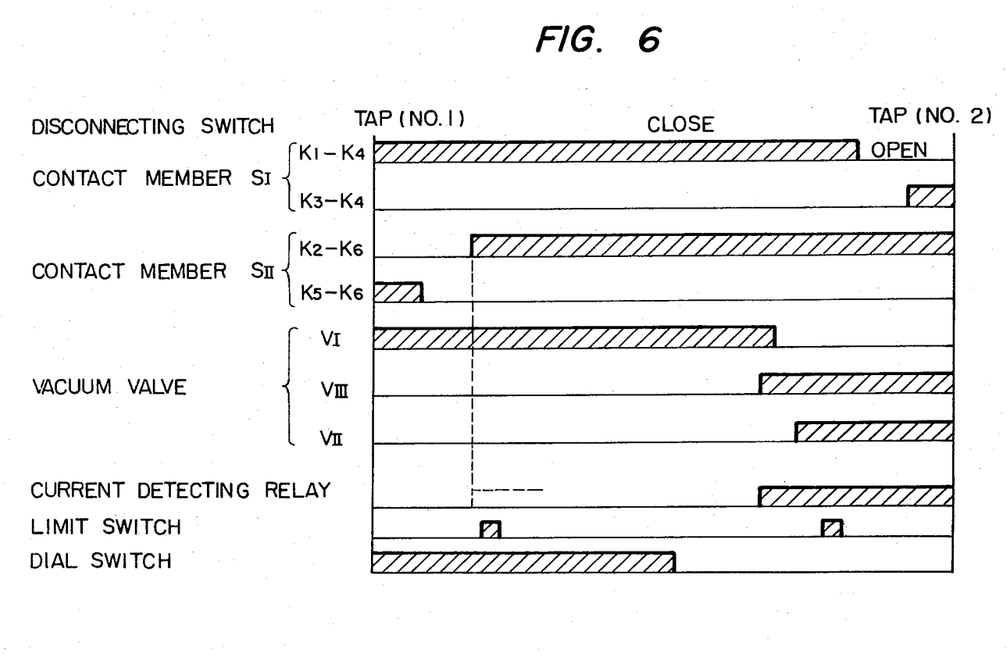
FIG. 6 is a diagram showing the switching sequence of opening and closing operations of the respective components in the circuit shown in FIG. 4 between tap no. 1 and tap no. 2.

FIG. 6 shows the switching sequence of these components of the vacuum interrupter type on-line tap changer when the tap is changed from tap no. 1 to tap no. 2. In this case, the limit switch 38 is closed for a short time immediately after the contact member $S_{II}$ of the disconnecting switch 18 closes between the contacts $K_2$ and $K_6$ of the switch 18. The dial switch 40 is also closed at this time. Since no current flows through the current transformers $30_U$, $30_V$ and $30_W$ normally at this time, the contacts $34_U{'}$, $34_V{'}$ and $34_W{'}$ of the respective current detecting relays $34_U$, $34_V$ and $34_W$ are not closed.

However, in the case where a cross current is flowing between the taps in the circuit due to a malfunction of the vacuum valve $V_{III}$ or due to incomplete tap changing, the current transformers $30_U$, $30_V$ and $30_W$ detect the cross current and accordingly energize the current detecting relays $34_U$, $34_V$ and $34_W$. Thus, the contacts $34_U{'}$, $34_V{'}$ and $34_W{'}$ of the relays $34_U$, $34_V$ and $34_W$, respectively, are closed. Hence, the circuit from the terminal P of the control power source through the dial switch 40, the limit switch 38, the contacts $34_U{'}$, $34_V{'}$ and $34_W{'}$ and the detecting relay 36 to the terminal N of the control power source closes thereby energizing the detecting relay 36 (as indicated by a broken line in the detecting relay current waveform in FIG. 6). Thus, the detecting relay 36 operates to break the transformer from the circuit before the current limiting resistor 26 burns out due to failure of the vacuum interrupter $V_{III}$.

When the rotating shaft 42 is further rotated together with the cam 44 mounted thereon and the limit switch 38 is closed by the second projection of the cam 44 (the vacuum interrupter $V_{III}$ is opened while the vacuum interrupters $V_1$ and $V_{II}$ are closed), the dial switch 40 is opened while the contacts $34_U{'}$, $34_V{'}$ and $34_W{'}$ of the current detecting relays $34_U$, $34_V$ and $34_W$, respectively, cooperating therewith are closed. At that time, the detecting relay 36 is inoperative.

The overcurrent relays $32_U$, $32_V$ and $32_W$ are thus always energized in this case. In the case where a short-circuit between the taps occurs due to a drop in the degree of vacuum of the vacuum interrupter $V_I$ or $V_{II}$, the overcurrent relays $32_U$, $32_V$ and $32_W$ will detect the abnormal current flowing through the circuit and in response disconnect the transformer from the circuit.

Figure 7:
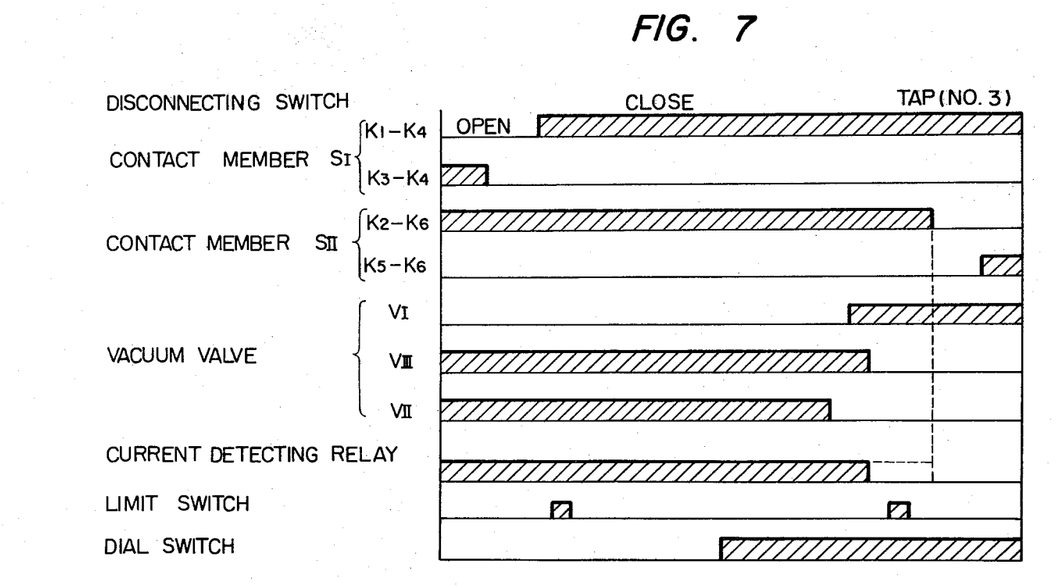
FIG. 7 is a diagram showing the switching sequence of the opening and closing operations of the respective components in the circuit shown in FIG. 4 between tap no. 2 and tap no. 3 (or the tap no 1)

FIG. 7 shows the switching sequence of the components in the vacuum valve type on-line tap changer when the tap is changed from tap no. 2 to tap no. 3 (or to tap no. 1). In this case, the dial switch 40 is opened at the time when the limit switch 38 is initially closed as the first projection of the cam 44 presses the limit switch roller 46 thereby closing the limit switch 38. Accordingly, the detecting relay 36 is not operated. The second projection of the cam 44 next presses the limit switch roller 46 thereby closing the limit switch 38, i.e., the dial switch 40 makes contact with the contact corresponding to tap no. 3 (or tap no. 1) and accordingly opens at the position immediately before the contact member $S_{II}$ of the disconnecting switch 18 opens and the connection between the contacts $K_2$ and $K_6$ after the vacuum interrupter $V_{III}$ is opened. Therefore, if a cross current between the taps flows in the circuit in the same manner as described above, the cross current will be detected by the current transformers $30_U$, $30_V$ and $34_W$ thereby energizing the current detecting relays $34_U$, $34_V$ and $34_W$, respectively, and the contacts $34_U'$, $34_V'$ and $34_W'$ of the respective relays $34_U$, $34_V$ and $34_W$ will accordingly, be closed. Thus, the circuit from the terminal P of the control power source through the dial switch 40, the limit switch 39, the contacts $34_U'$, $34_V'$ and $34_W'$ and the detecting relay 36 to the terminal N of the control power source will close, thereby energizing the detecting relay 36 (as indicated by a broken line at the detecting relay current waveform in FIG. 7). Thus, the detecting relay 36 operates to break the connection of the transformer from the circuit before the contact member $S_{II}$ of the disconnecting switch 18 interrupts the cross current flowing between the taps between the contacts $K_2$ and $K_6$. In this case, the overcurrent relays $32_U$, $32_V$ and $32_W$ are constantly energized as described above.

It is noted that the foregoing description is directed to the operation of an apparatus for protecting a vacuum interrupter type on-line tap changer at the time of a tap changing operation from tap no. 3 (or to tap no. 1) However, the same operation can be conducted at the time of a tap changing operation between two taps.

It may be appreciated from the foregoing description of the first preferred embodiment of the invention that since the apparatus for protecting the vacuum interrupter type on-line tap changer according to the invention operates to detect the existence or absence of a cross current between the taps in combination with the dial switch for selecting the position of the tap of the above tap changer and the limit switch which closes only at predetermined positions during the tap changing operation, a cross current flowing between taps or a load current flowing for a long time due to a drop in the degree of vacuum of the vacuum interrupter, and incomplete switching states in the vacuum interrupter connected to the current limiting resistor are detected, burn-out of the current limiting resistor and/or damage to the contacts of the disconnecting switch due to interruption of the current are prevented.

It may also be understood that with the apparatus of the first embodiment of the invention thus constructed, an abnormal current will be detected through the current transformers by the overcurrent relay when a short-circuit between the taps occurs due to a drop in the degree of vacuum in the vacuum interrupters and/or an interruption failure thereby immediately disconnecting the transformer from the circuit so as to protect it.

It may further be appreciated that with the apparatus of the first embodiment of the invention thus constructed, the contacts of the dial switch will not be damaged due to an arc, even over long periods of time, due to elimination of the current switching operations of the switch, thereby improving the durability of the entire apparatus.

A second embodiment of an apparatus for protecting a vacuum valve type on-line tap changer according to the invention will be described with reference to FIG. 8.

Figure 8:
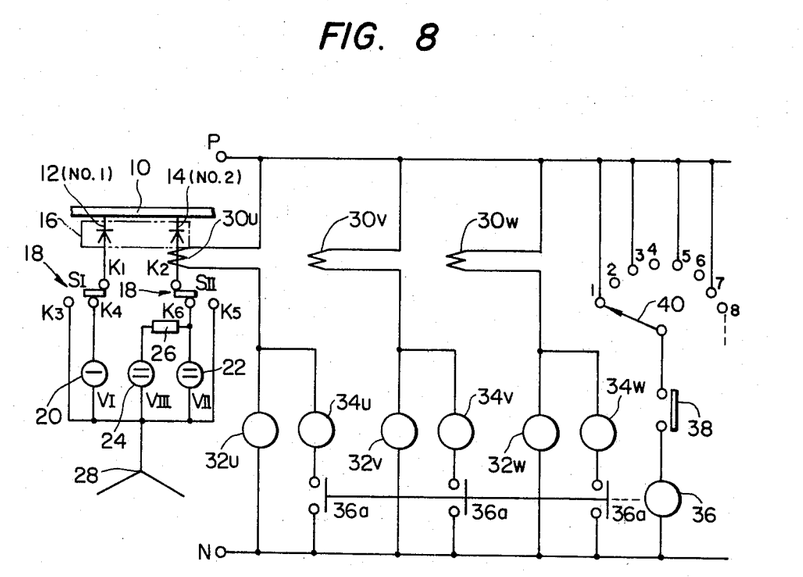
FIG. 8 is a circuit diagram showing a preferred second embodiment of an apparatus for protecting a vacuum interrupter type on-line tap changer according to the invention.

FIG. 8 shows a circuit diagram of the second embodiment of an apparatus for protecting a vacuum interrupter type on-line tap changer for one phase of a 1-resistor 3-vacuum interrupter type similar to that of FIG. 4 in which like reference numerals and characters designate the same or equivalent components as in FIG. 4. A further description of the same components will be omitted.

To the current transformers $30_U$, $30_V$ and $30_W$ are connected in series overcurrent relays $32_U$, $32_V$ and $32_W$, respectively. Further, the series connected circuts of the current transformers $30_U$, $30_V$ and $30_W$ and the overcurrent relays $32_U$, $32_V$ and $32_W$, respectively, are connected between the terminals P and N of the control power source in parallel with each other.

The current detecting relays $34_U$, $34_V$ and $34_W$ are connected in parallel with the overcurrent relays $32_U$, $32_V$ and $32_W$, respectively. Further, normally open contact $36a$ are connected in series with the current detecting relays $34_U$, $34_V$ and $34_W$. The normally open contacts $36a$ are operated by the relay 36, which can detect even very small currents by detecting a load current flowing at the time of normal tap changing operating and a cross current flowing between the taps to thereby prevent circuit failure. The series connections of the current detecting relays $34_U$, $34_V$ and $34_W$, and the normally open contacts $36a$ are respectively connected in parallel with the overcurrent relays $32_U$, $32_V$ and $32_W$ and hence are also connected through the current transformers $30_U$, $30_V$ and $30_W$ between the terminals P and N of the control power source.

The detecting relay 36 is connected at one end to the terminal N of the control power source and is connected at the other end through the limit switch 38 and the dial switch 40 to the terminal P of the control power source. The limit switch 38 is installed in the motor operating unit in the same manner as in the first embodiment. Thus, the energization of the detecting relay 36 is controlled by the limit switch 38 and the dial switch 40.

The operation of the apparatus for protecting the vacuum valve type on-line tap changer of the second embodiment of the invention as shown in FIG. 8 will be described with reference to the sequence diagrams of the disconnecting switch 18, the vacuum valves $V_I$ through $V_{III}$, the limit switch 38 and the dial switch 40 in the case where the tap of the vacuum interrupter type on-line tap changer is changed.

Figure 9:
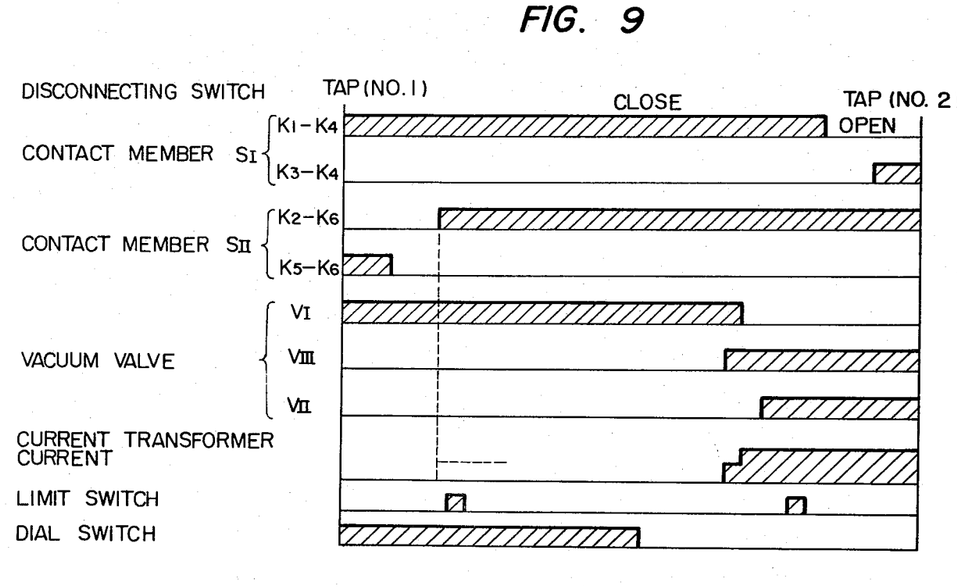
FIG. 9 is a diagram showing the switching sequence of opening and closing operations of the respective components in the circuit shown in FIG. 8 between tap no. 1 and tap no. 2.

FIG. 9 shows the switching sequence of these components in the vacuum interrupter type on-line tap changer when the tap is changed from tap no. 1 to tap no. 2. In this case, the limit switch 38 is closed for a short time immediately after the contact member $S_{II}$ of the disconnecting switch 18 closes between the contacts $K_2$ and $K_6$ of the switch 18. The dial switch 40 is also closed at this time. Accordingly, the relay 36 is energized through the limit switch 38 and the dial switch 40 between the terminals P and N of the control power source, thereby closing the respective contacts $36a$. At this time, the current detecting relays $34_U$, $34_V$ and $34_W$ are energized. Therefore, if a cross current between the taps flows in the circuit due to a malfunction of the vacuum interrupter $V_{III}$ and/or an incomplete switching state, the cross current will be detected through the current transformers $30_U$, $30_V$ and $30_W$ by the current detecting relays $34_U$, $34_V$ and $34_W$, respectively (as indicated by a broken line in the current transformer current waveform in FIG. 9).

The current detecting relays $34_U$, $34_V$ and $34_W$ are provided with contacts (not shown) cooperating with the relays $34_U$, $34_V$ and $34_W$ and mechanically linked with the breakers to be opened thereby so as to disconnect the transformer from the circuit before the current limiting resistor 26 burns out due to failure of the vacuum interrupter $V_{III}$.

When the rotating shaft 42 is further rotated together with the cam 44 mounted thereon and the limit switch 38 is closed by the second projection of the cam 44 (the vacuum interrupter $V_{III}$ is opened while the vacuum interrupters $V_I$ and $V_{II}$ are closed), the dial switch 40 is opened while the relay 36 is not energized with the result that the current detecting relays $34_U$, $34_V$ and $34_W$ become inoperative.

Figure 10:
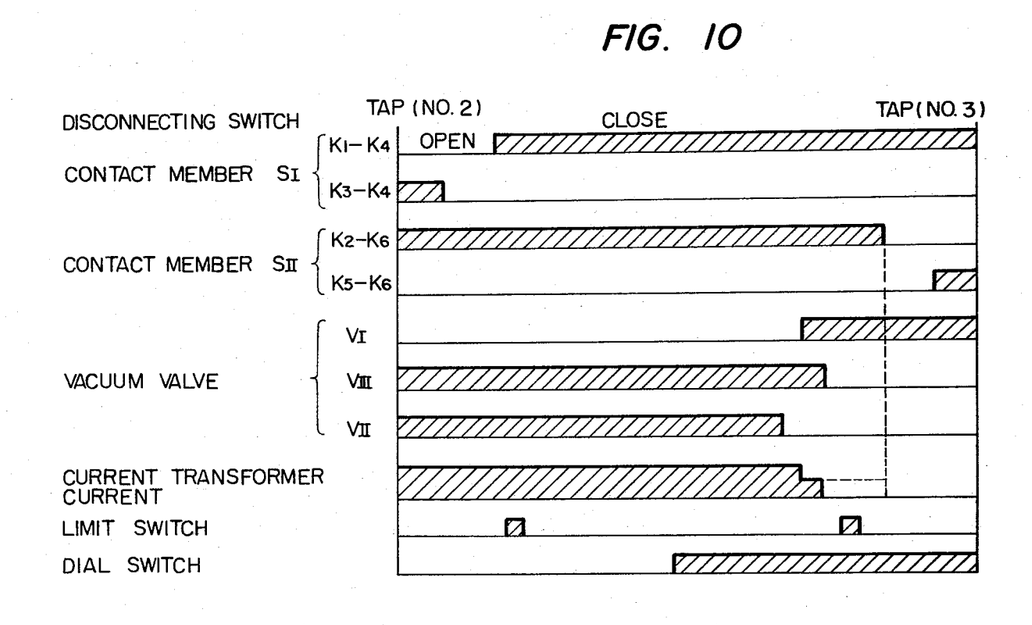
FIG. 10 is a diagram showing the switching sequence of opening and closing operations of the respective components in the circuit shown in FIG. 8 between tap no. 2 and tap no. 3 (or tap no. 1).

FIG. 10 shows the switching sequence of the components in the vacuum valve type on-line tap changer when the tap is changed from tap no. 2 to tap no. 3 (or to tap no. 1). In this case, the dial switch 40 is opened at the time when the limit switch 38 is initially closed as the first projection of the cam 44 presses the limit switch roller 46 thereby closing the limit switch 38. Accordingly, the detecting relay 36 is not energized, nor are the current detecting relays $34_U$, $34_V$ and $34_W$ operated. The second projection of the cam 44 presses the limit switch roller 46 thereby closing the limit switch 38 in the second stage of the operation. That is, the dial switch 40 makes contact with the contact corresponding to the tap no. 3 (or tap no. 1) and accordingly opens at the position immediately before the contact member $S_{II}$ of the disconnecting switch 18 opens the connection between the contacts $K_2$ and $K_6$ after the vacuum interrupter $V_{III}$ is opened. Therefore, the relay 36 is energized thereby closing the contacts 36a in the three parallel circuits. Since the current detecting relays $34_U$, $34_V$ and $34_W$ are energized at this time, if a cross current between the taps flows in the circuit in the same manner as described above, the cross current will be detected by the current transformers $30_U$, $30_V$ and $30_W$ through the current detecting relays $34_U$, $34_V$ $34_W$ (as indicated by a broken line in the current transformer current waveform in FIG. 10). Thus, the detecting relay 36 operates to disconnect the transformer from the circuit before the contact member $S_{II}$ of the disconnecting switch 18 interrupts the cross current between the contacts $K_2$ and $K_6$.

It is noted that the foregoing description is directed to the operation of an apparatus for protecting a vacuum interrupter type on-line tap changer at the time of a tap changing operation from tap no. 1 to tap no. 2 as well as from tap no. 2 to tap no. 3 (or to tap no. 1). However, the same operation can be conducted for changing between any two taps positions.

It may be appreciated from the foregoing description of the second preferred embodiment of the invention that since the apparatus for protecting the vacuum interrupter type on-line tap changer according to the invention detects the existence or absence of a cross current between the taps in combination with the dial switch for selecting the position of the tap of the above tap changer and the limit switch closes only at a predetermined position during the tap changing operation, the cross current between the taps or a load current which flows for a long time due to a drop in the degree of vacuum of the vacuum interrupter or an incomplete switching state in the vacuum interrupter connected to the current limiting resistor can be detected thereby preventing burn-out of the current limiting resistor and/or damage to the contacts in the disconnecting switch due to the interruption of the current.

It may be also be understood that with the apparatus of the second embodiment of the invention thus constructed, an abnormal current through the current transformers can be detected by the overcurrent relay when a short-circuit between the taps occurs due to a drop in the degree of vacuum in the vacuum interrupters and/or an interruption failure thereby immediately disconnecting the transformer from the circuit so as to protect it.

It may further be appreciated that with the apparatus of the second embodiment of the invention thus constructed, the contacts of the dial switch will not be damaged due to an arc, even for long periods of use, due to elimination of the current switching operations of the switch. Thus the service life and durability of the entire apparatus are improved.

While various embodiments have been particularly described, these are of course subject to considerable variation. Therefore, it will be understood that the foregoing specific examples and embodiments are given by way of illustration only, and that changes, omissions, additions, substitutions and/or modifications can be made within the scope of the claims without departing from the spirit of the invention.

What is claimed is:

1. A vacuum interrupter type on-line tap changer comprising: a plurality of current switching elements, each of said current switching elements being coupled to a corresponding tap of a transformer through a lead wire;

a plurality of vacuum interrupters and a current limiting resistor, said vacuum interrupters and said current limiting resistor being coupled to said current switching elements so that a cross current can flow selectively through said current limiting resistor and said vacuum interrupters in accordance with contact positions of said current switching elements;

a plurality of current transformers, said current transformers being disposed to sense a current in said lead wires;

a plurality of current detecting relays and overcurrent relays, one of said current detecting relays and one of said overcurrent relays being provided for each of said current transformers, said current detecting relays and said overcurrent relays being operatively coupled to a corresponding current transformer, each of said overcurrent relays having a contact for interrupting current flowing in said transformer.

2. The vacuum interrupter type on-line tap changer of claim 1 wherein each said current transformers and its corresponding current detecting relay and overcurrent relay are coupled in series with one another.

3. The vacuum interrupter type on-line tap changer of claim 2 further comprising a dial switch having a plurality of input contacts, at least alternate ones of said input contacts being coupled to a first terminal of a voltage source, said dial switch having an output wiper contact; a limit switch having an input contact coupled to said wiper contact of said dial switch; a plurality of relay contacts coupled in parallel with one another, each of said relay contacts being operated by a corresponding one of said current detecting relays, a first commonly-connected terminal of each of said relay contacts being coupled to a second contact of said limit switch; and a detecting relay coupled in series between a commonly-connected second terminal of said relay contacts and a second terminal of said voltage source, said detecting relay having a contact for interrupting current flow in said transformer.

4. The vacuum interrupter type on-line tap changer of claim 1 wherein each said overcurrent relay is coupled in series with a corresponding current transformer between first and second terminals of a voltage source, each of said current detecting relays having a first terminal coupled to a common junction point between corresponding current transformers and overcurrent relays, and further comprising a dial switch having a plurality of input contacts at least alternate ones of which are coupled to said first terminal of said voltage source and an output wiper contact; a limit switch having a first contact coupled to said wiper contact of said dial switch; a current detecting relay coupled in series between a second contact of said limit switch and said second terminal of said voltage source, said detecting relay having a plurality of contacts equal in number to the number of said current detecting relays, each of said contacts of said detecting relay being coupled between a second terminal of a corresponding current detecting relay and said second terminal of said voltage source.

5. The vacuum interrupter type on-line tap changer of any one of claims 1-4 wherein said limit switch is mechanically linked to be operated upon rotation of said wiper contact of said dial switch.

6. The vacuum interrupter type on-line tap changer of any one of claims 1-4 wherein said dial switch comprises gear means mechanically coupled to be operated by rotation of said wiper contact and an output shaft rotated by said gear means, wherein one complete revolution of said output shaft corresponds to one tap changing operation performed by said wiper contact; a cam coupled to be rotated by said output shaft, said cam having first and second projections formed thereon with a recess being formed between inner adjacent edges of said cam projections wherein a cam angle between an inner edge of one of said projections and a lowest point of said recess is equal to an angle formed between said inner edge of the other of said cam projections and said lowest point of said recess and said projections being substantially equal in length; and a switch roller disposed between said cam and said limit switch.

7. The vacuum interrupter type on-line tap changer of any one of claims 1-4 wherein said dial switch comprises a gear means mechanically coupled to be operated by rotation of said wiper contact and an output shaft rotated by said gear means, wherein one complete revolution of said output shaft corresponds to one tap changing operation performed by said wiper contact; a cam coupled to be rotated by said output shaft, said cam having first and second projections formed thereon with a recess formed between inner adjacent edges of said cam projections wherein a cam angle between an inner edge of one of said projections and a lowest point of said recess is equal to an angle formed between said inner edge of the other of said cam projections and said lowest point of said recess and said projections being substantially equal in length; a switch roller disposed between said cam and said limit switch, and wherein said cam projections are positioned such that, during a tap changing operation, said limit switch is closed immediately before at least one of said switching elements opens a connection to said taps of said transformer.

8. The vacuum interrupter type on-line tap changer of claim 2 or 4 wherein only alternate ones of said input contacts of said dial switch are coupled to said terminal of said voltage source.

* * * * *